US011815180B2

(12) United States Patent
Barton et al.

(10) Patent No.: US 11,815,180 B2
(45) Date of Patent: Nov. 14, 2023

(54) TENSIONER WITH STAMPED PIVOT PIN

(71) Applicant: Schaeffler Technologies AG & Co. KG, Herzogenaurach (DE)

(72) Inventors: Austin Barton, Windsor (CA); Gregory Cowen, Tecumseh (CA); Zechariah Van Steenbergen, Windsor (CA)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 79 days.

(21) Appl. No.: 17/410,229

(22) Filed: Aug. 24, 2021

(65) Prior Publication Data

US 2023/0068785 A1 Mar. 2, 2023

(51) Int. Cl.
*F16H 7/08* (2006.01)
*F16H 7/06* (2006.01)
*F16H 7/18* (2006.01)

(52) U.S. Cl.
CPC ...... *F16H 7/08* (2013.01); *F16H 7/06* (2013.01); *F16H 7/18* (2013.01); *F16H 2007/0842* (2013.01); *F16H 2007/0863* (2013.01); *F16H 2007/0872* (2013.01); *F16H 2007/0893* (2013.01); *F16H 2007/185* (2013.01)

(58) Field of Classification Search
CPC ...... F16H 7/00; F16H 7/06; F16H 7/08; F16H 2007/0804; F16H 2007/081; F16H 2007/0842; F16H 2007/0863; F16H 2007/0872; F16H 2007/0893; F16H 7/18; F16H 2007/185

See application file for complete search history.

(56) References Cited

U.S. PATENT DOCUMENTS

| | | | | |
|---|---|---|---|---|
| 4,713,043 | A * | 12/1987 | Biedermann | F16H 7/0848 474/111 |
| 5,045,032 | A * | 9/1991 | Suzuki et al. | F16H 7/08 474/140 |
| 5,286,234 | A * | 2/1994 | Young | F16H 7/08 474/140 |
| 5,425,680 | A * | 6/1995 | Young | F16H 7/08 474/111 |
| 5,957,793 | A * | 9/1999 | Schulze | F16H 7/08 474/140 |
| 6,238,311 | B1 * | 5/2001 | Cutting | F16H 7/08 474/140 |
| 6,302,817 | B1 * | 10/2001 | Maute | F16H 7/18 198/860.3 |
| 6,322,471 | B1 * | 11/2001 | Hashimoto | F16H 7/18 474/140 |
| 6,406,391 | B1 * | 6/2002 | Ullein | F16H 7/08 111/140 |
| 6,524,202 | B1 * | 2/2003 | Tada et al. | F16H 7/08 474/140 |
| 6,623,391 | B2 * | 9/2003 | Young et al. | F16H 7/08 474/140 |
| 6,902,505 | B2 * | 6/2005 | Yonezawa et al. | F16H 7/08 474/140 |

(Continued)

FOREIGN PATENT DOCUMENTS

CN 106536982 A * 3/2017 .................. F16H 7/08

*Primary Examiner* — Michael R Mansen
*Assistant Examiner* — Raveen J Dias

(57) ABSTRACT

A method of fabricating a chain tensioner includes bending a sheet metal blank to form a connector portion perpendicular to a flat base. The connector portion has an arm extending beyond the base. The method further includes stamping an end of the arm to curl the end into a hollow cylinder having an axis perpendicular the flat base. Curling the end into a hollow cylinder may be performed in a series of stamping operations. The blank may define a gap which extends around a narrower portion of the arm after the end is curled into the hollow cylinder.

5 Claims, 5 Drawing Sheets

(56) References Cited

U.S. PATENT DOCUMENTS

| | | | | |
|---|---|---|---|---|
| 7,641,577 B2* | 1/2010 | Markley et al. | ......... | F16H 7/08 474/111 |
| 8,057,333 B2* | 11/2011 | Haesloop | .......... | A61K 38/4886 474/111 |
| 8,617,012 B2* | 12/2013 | Young et al. | ............ | F16H 7/08 474/140 |
| 8,672,785 B2* | 3/2014 | Young | .................... | F16H 7/08 474/111 |
| 8,690,717 B2* | 4/2014 | Fuhrmann et al. | ........ | F16H 7/08 474/111 |
| 8,715,122 B2* | 5/2014 | Young | .................... | F16H 7/08 474/140 |
| 8,992,358 B2* | 3/2015 | Adams | .................... | F16H 7/08 474/140 |
| 9,523,413 B2* | 12/2016 | Kurematsu et al. | ...... | F16H 7/08 |
| 10,378,619 B2* | 8/2019 | Stiglmaier et al. | ...... | F16H 7/08 |
| 10,508,718 B2* | 12/2019 | Ikeda et al. | .............. | F16H 7/08 |
| 10,968,989 B2* | 4/2021 | Konno et al. | ............ | F16H 7/08 |
| 11,326,669 B2* | 5/2022 | Konno et al. | ............ | F16H 7/08 |
| 2002/0045503 A1* | 4/2002 | Young et al. | ............ | F16H 7/18 474/140 |
| 2002/0069539 A1* | 6/2002 | Tada | ...................... | F16H 7/18 30/383 |
| 2005/0266946 A1* | 12/2005 | Thomas et al. | .......... | F16H 7/18 474/111 |
| 2006/0025256 A1* | 2/2006 | Wake | ..................... | F16H 7/08 474/140 |
| 2006/0100048 A1* | 5/2006 | Wake et al. | .......... | F16H 7/0831 474/140 |
| 2006/0293136 A1* | 12/2006 | Markley et al. | ......... | F16H 7/18 474/140 |
| 2008/0280710 A1* | 11/2008 | Fuhrmann et al. | ....... | F16H 7/08 474/109 |
| 2009/0163311 A1* | 6/2009 | Haesloop | .......... | A61K 38/4886 474/111 |
| 2010/0022338 A1* | 1/2010 | Botez et al. | ............. | F16H 7/08 474/111 |
| 2010/0210384 A1* | 8/2010 | Young et al. | ............ | F16H 7/08 474/111 |
| 2011/0294613 A1* | 12/2011 | Fuhrmann et al. | ....... | F16H 7/08 474/111 |
| 2011/0306449 A1* | 12/2011 | Adams | .................... | F16H 7/08 474/140 |
| 2012/0035010 A1* | 2/2012 | Young | .................... | F16H 7/08 474/111 |
| 2012/0052997 A1* | 3/2012 | Young | .................... | F16H 7/08 474/111 |
| 2015/0005120 A1* | 1/2015 | Kurematsu et al. | ...... | F16H 7/08 474/111 |
| 2015/0037534 A1* | 2/2015 | Schott et al. | ............. | B32B 3/04 72/306 |
| 2016/0136713 A1* | 5/2016 | Narita | .................... | B21D 5/01 428/603 |
| 2016/0252167 A1* | 9/2016 | Guyot et al. | ............ | F16H 7/08 474/111 |
| 2016/0312863 A1* | 10/2016 | Simmons | ................ | F16H 7/08 |
| 2017/0009849 A1* | 1/2017 | Stiglmaier et al. | ...... | F16H 7/08 |
| 2017/0086948 A1* | 3/2017 | Von Mandach | ........ | A61C 7/141 |
| 2017/0152923 A1* | 6/2017 | Doveri | .................... | F16H 7/08 |
| 2018/0094708 A1* | 4/2018 | Ikeda et al. | .............. | F02F 7/0043 |
| 2018/0347672 A1* | 12/2018 | Konno et al. | ............ | F16H 7/08 |
| 2019/0003558 A1* | 1/2019 | Kumar et al. | ............ | F16H 7/06 |
| 2020/0116238 A1* | 4/2020 | Konno et al. | ............ | F16H 7/18 |
| 2020/0256434 A1* | 8/2020 | Kurematsu et al. | ...... | F16H 7/18 |

* cited by examiner

TENSIONER WITH STAMPED PIVOT PIN

TECHNICAL FIELD

The disclosure relates to automotive belt or chain tensioners. More particularly, the disclosure relates to a tensioner assembly having a stamped hollow pivot pin.

BACKGROUND

In automotive engines, it is common to use belts and/or chains to transfer power and motion between parallel shafts, such as from a crankshaft to a camshaft. A driven segment of the belt or chain is placed in tension by the transmitted torque. However, other segments may not be in tension and may therefore have a tendency to become loose. A tensioner assembly places a transverse load on the segment of the belt or chain to put it in tension even when it is not transmitting power.

SUMMARY

A tensioner assembly includes a stamped support and a tensioner arm. The stamped support has a flat base adapted for fixation to an engine and a connector portion bent perpendicular to the flat base. The connector portion has an arm with a first end curled into a hollow pin such that the pin defines an axis perpendicular to the base. The tensioner arm defines a hole, wherein a portion of the pin extends into the hole such that the tensioner arm pivots with respect to the support about the axis. The tensioner arm may also include an arc portion concentric with the hole and spaced away from the hole, wherein a portion of the arm is located between the hole and the arc portion.

A method of fabricating a chain tensioner includes bending a sheet metal blank to form a connector portion perpendicular to a flat base. The connector portion has an arm extending beyond the base. The method further includes stamping an end of the arm to curl the end into a hollow cylinder having an axis perpendicular the flat base. Curling the end into a hollow cylinder may be performed in a series of stamping operations. The blank may define a gap which extends around a narrower portion of the arm after the end is curled into the hollow cylinder.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
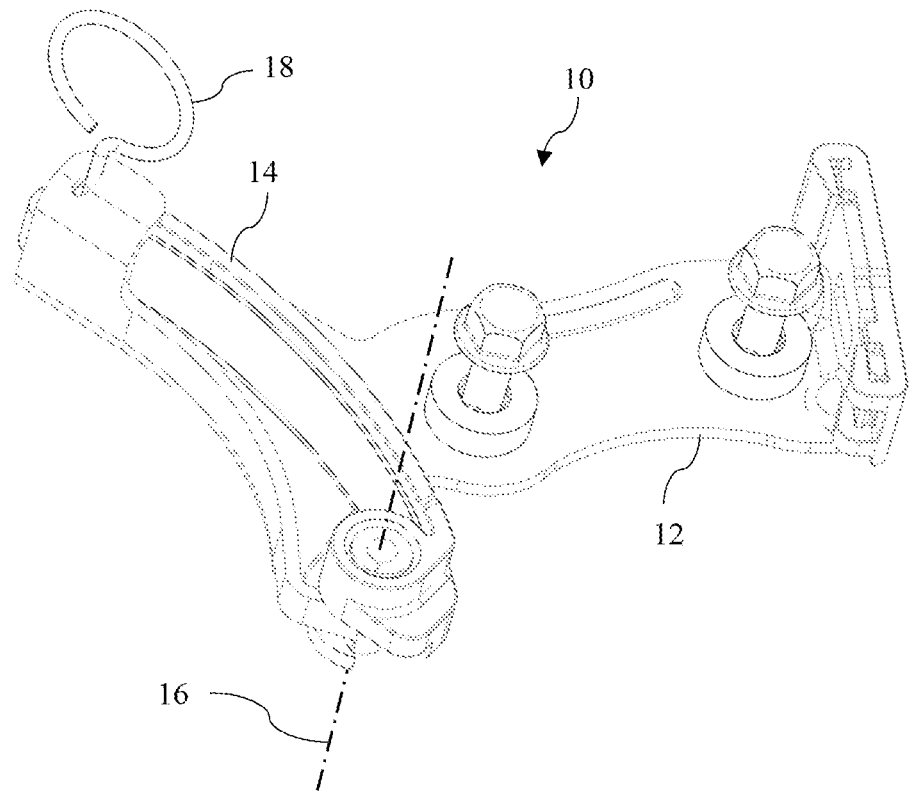
FIG. 1 is a pictorial view of a tensioner assembly ready for installation on an engine.

FIG. 1 shows a chain tensioner assembly 10 with two parts: a support 12 adapted for fixation to a surface of an engine and a tensioner arm 14. The support includes a pin that defines an axis 16 perpendicular to the engine surface. A transport pin 18 fixes the tensioner arm in a retracted position with respect to the support during assembly. Once the transport pin is removed, a spring causes the tensioner arm to rotate about the axis 16 to place a chain in tension.

Figure 2:
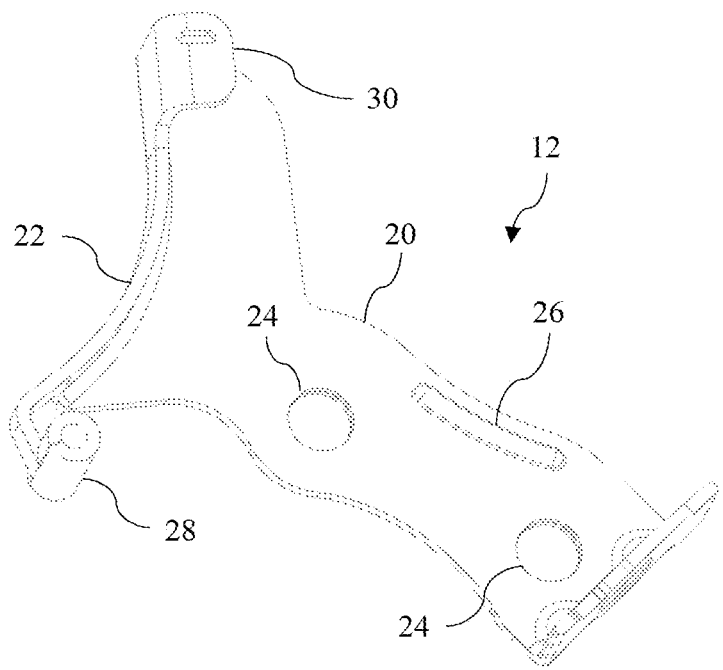
FIG. 2 is a pictorial view of the support element of the tensioner assembly of FIG. 1.

FIG. 2 shows the support 12. The support includes a flat portion 20 and a connector portion 22 which extends perpendicularly to the flat portion. There may be a number of holes 24 in the flat portion to accommodate fasteners to fasten the support to the engine surface. One of more stiffening ribs 26 may also be formed into the flat portion. The pin 28 is formed into one end of the connector portion 22 by a stamping process. Due to the nature of the stamping process, the pin 28 is hollow. On the opposite end of the connector portion, a flange 30 is formed to accommodate the transport pin. A gap 38 is formed at one end of the wider portion. The width and vertical location of the gap 38 corresponds to the width and vertical location of the barrower portion 34.

Figure 3:
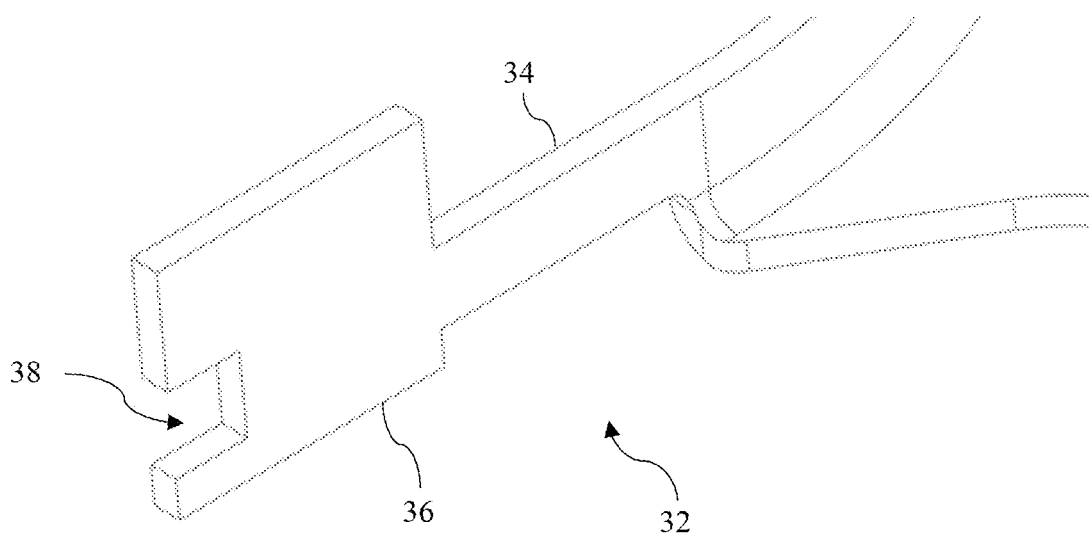
FIG. 3 is a pictorial view of a portion of the support element of FIG. 2 during a first stage of fabrication.

FIG. 3 shows the pin end of the connector portion during an early stage of the stamping process. The connector portion includes an arm 32 that extends beyond the flat portion. The arm includes a narrower portion 34 near the flat portion and a wider portion 36 further from the flat portion.

Figure 4:
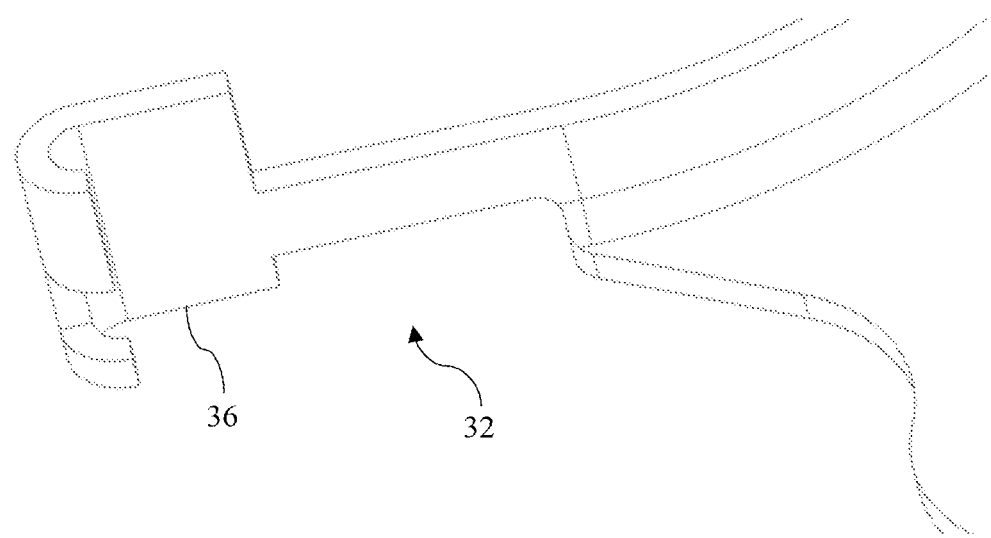
FIG. 4 is a pictorial view of the portion of the support element of FIG. 3 at a second stage of fabrication.
Figure 5:
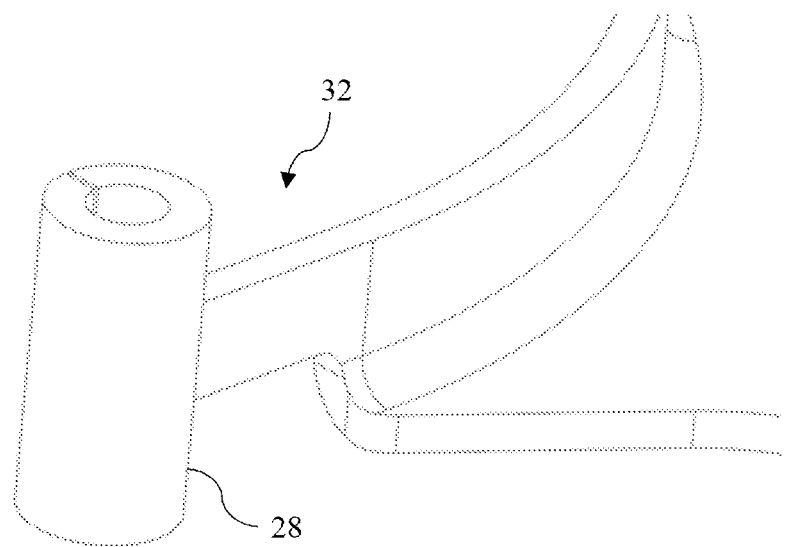
FIG. 5 is a pictorial view of the portion of the support element of FIG. 3 at a third stage of fabrication.
Figure 6:
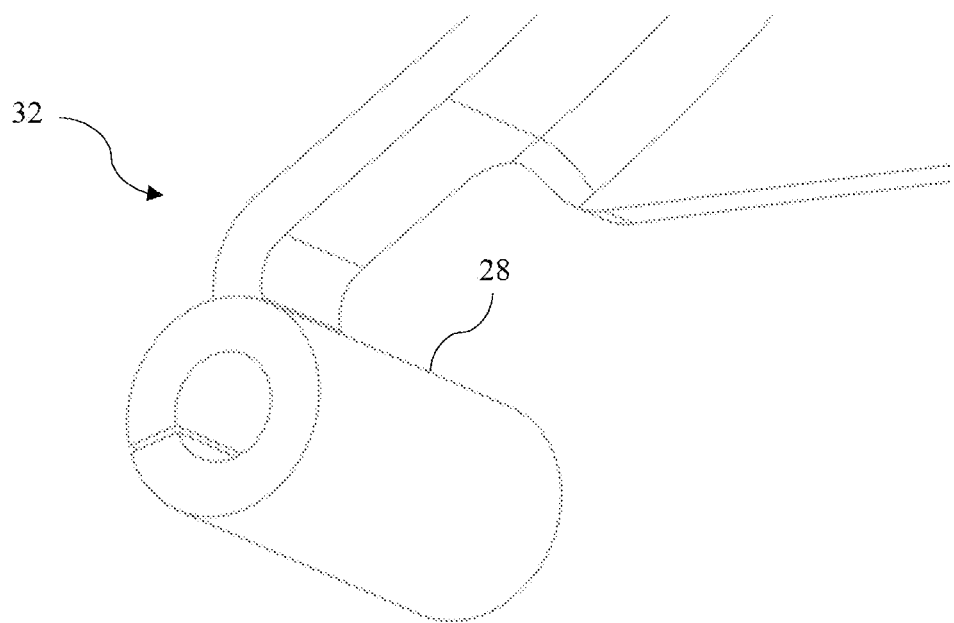
FIG. 6 is a pictorial view of the portion of the support element of FIG. 3 at a fourth stage of fabrication.
Figure 8:
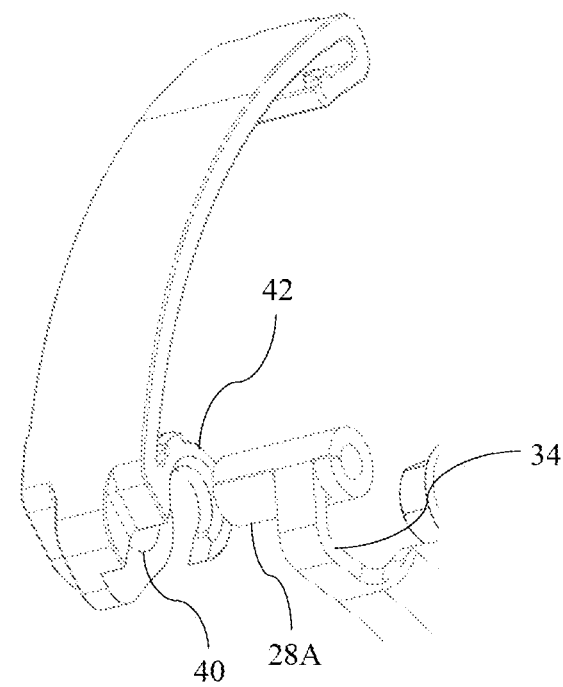
FIG. 8 is a pictorial view of the tensioner assembly of FIG. 1 at a first stage of assembly of the tensioner arm to the support element.

FIG. 4 shows the arm after a further manufacturing step. Part of the wider portion 36 has been rolled into a curve. FIG. 5 shows the arm after forming of the pin 28 is completed by additional stamping steps. The gap now extends around the narrower portion of the arm as best seen in FIG. 8. FIG. 6 shows the arm after an additional stamping step has bent the narrower portion.

Figure 7:
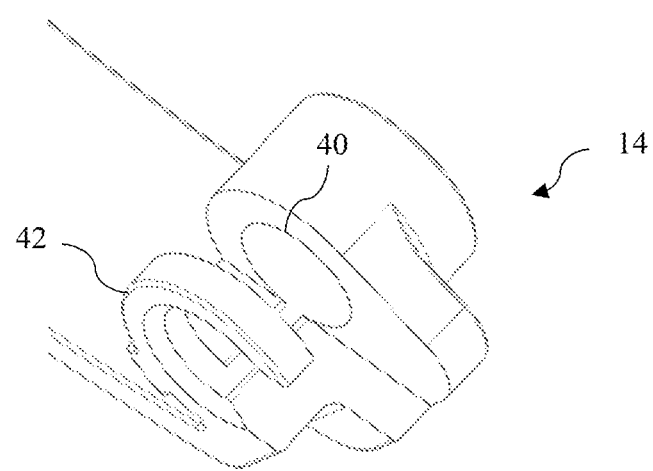
FIG. 7 is a pictorial view of a portion of the tensioner arm of the tensioner assembly of FIG. 1.
Figure 9:
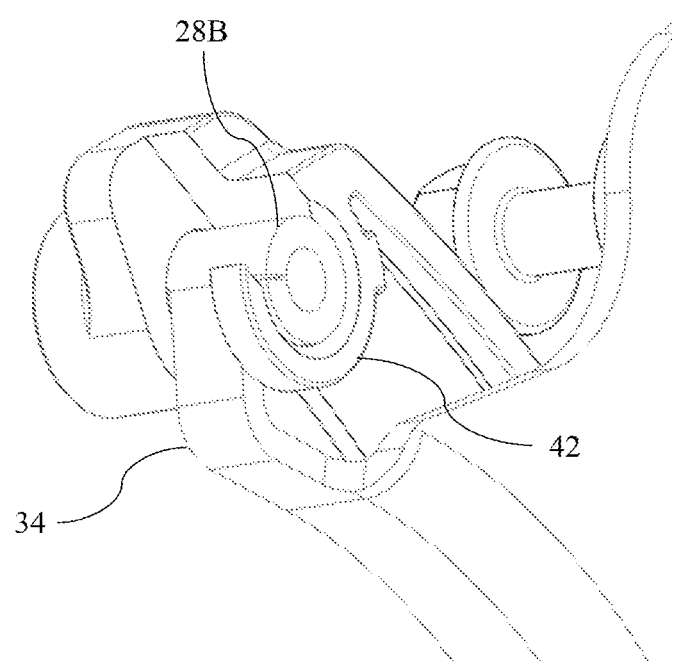
FIG. 9 is a pictorial view of the tensioner assembly of FIG. 1 at a second stage of assembly of the tensioner arm to the support element.

FIG. 7 shows the end of the tensioner arm 14 which engages the hollow pin 28. The tensioner arm defines a hole 40 which fits around the pin 28. An arc portion 42 is spaced away from the hole but is concentric with the hole. FIG. 8 shows an assembly step in which the tensioner arm is installed around the hollow pin 28. One end 28A of the pin on one side of the narrower portion 34 is inserted through the arc portion 42 into the hole 40. During this insertion step, the narrower portion 34 fits through the open part of the arc portion 42. FIG. 9 shows the assembly after the tensioner arm has been rotated into its operating position. In this position, the narrower portion 34 fits between the hole 40 and the arc portion 42. The arc portion engages a second end 28B of the pin on an opposite side of the narrower portion 34.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A tensioner assembly comprising:

a stamped support having a flat base adapted for fixation to an engine and a connector portion bent perpendicular to the flat base, the connector portion having an arm with a first end curled into a hollow pin such that the hollow pin defines: i) a gap which extends around a narrower portion of the arm after the first end of the is curled into the hollow pin, and ii) an axis perpendicular to the flat base; and a tensioner arm defining a hole, wherein a portion of the pin extends into the hole such that the tensioner arm pivots with respect to the support about the axis.

2. The tensioner assembly of claim 1 wherein the tensioner arm further includes an arc portion concentric with the hole and spaced away from the hole, wherein a portion of the arm is located between the hole and the arc portion.

3. A method of fabricating a chain tensioner, comprising:

bending a sheet metal blank to form a connector portion perpendicular to a flat base, the connector portion having an arm extending beyond the flat base; and stamping an end of the arm to curl the end into a hollow cylinder having an axis perpendicular to the flat base, wherein the sheet metal blank defines a gap which extends around a narrower portion of the arm after the end is curled into the hollow cylinder.

4. The method of claim 3, wherein curling the end into the hollow cylinder is performed in a series of stamping operations.

5. The method of claim 3, wherein curling the end into the hollow cylinder is performed after bending the sheet metal blank to make the connector portion be perpendicular to the flat base.

* * * * *